Aug. 29, 1950     B. H. HOOK     2,520,544
GRAB HOOK
Filed June 3, 1946
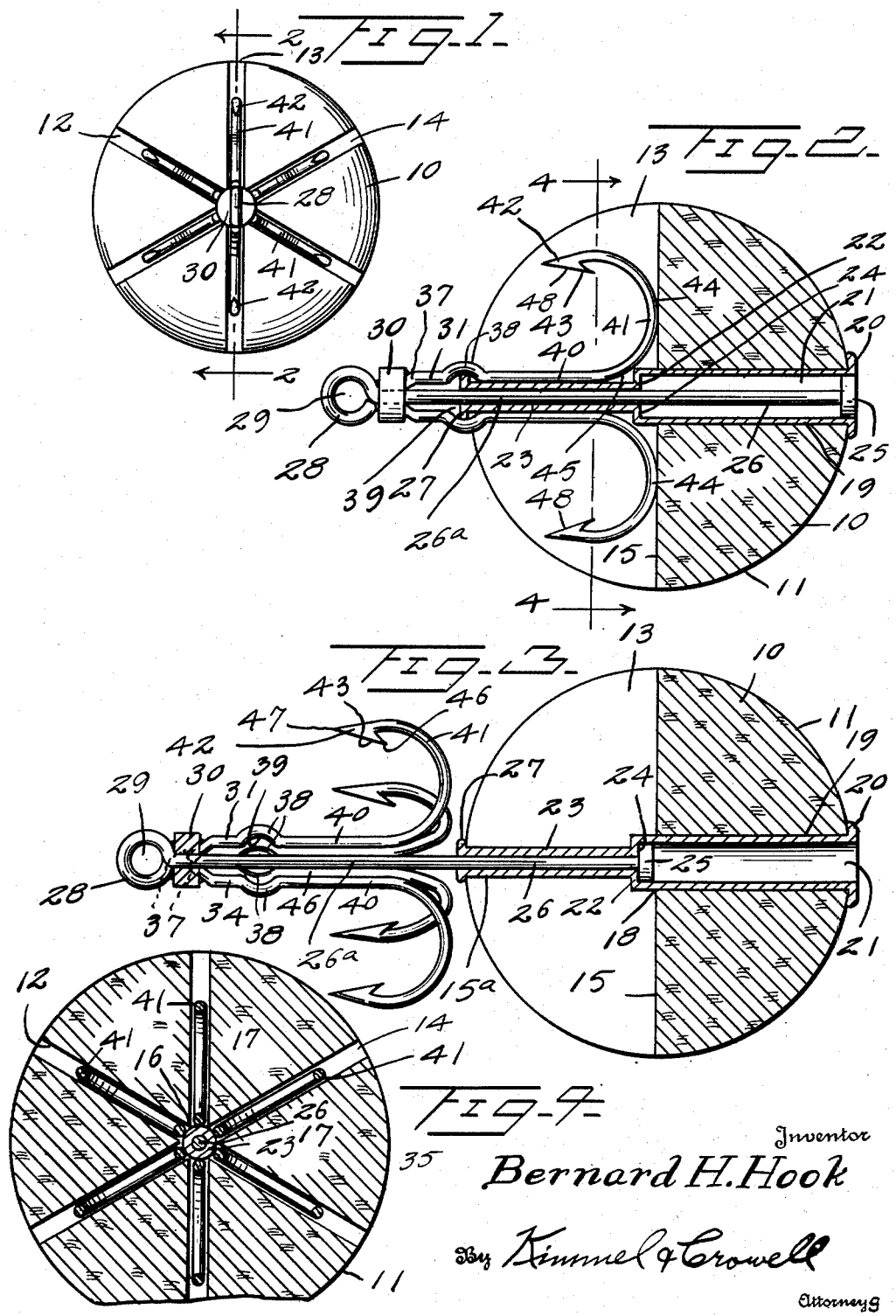
Inventor
Bernard H. Hook
By Kimmel & Crowell
Attorneys Patented Aug. 29, 1950

2,520,544

UNITED STATES PATENT OFFICE 2,520,544

GRAB HOOK

Bernard H. Hook, New Castle, Pa.

Application June 3, 1946, Serial No. 674,082

10 Claims. (Cl. 43—1)

The present invention relates to improvements in grapple hooks and has for its object to provide a simple, efficient and inexpensive device of this character.

One of the objects thereof is to provide a form of grappling device for clawing an object on the surface of a body of water and drawing it in. To this end the grapple hook forms a vital element of this invention.

Another object thereof is to provide a grappling device which, when not in serviceable use, is readily encased in a buoyant body that may float upon the water when tossed by an attendant thereupon. For the purpose of extending the grapple hook part of the device out of the buoyant body and render it immediately operable to grapple the desired object floating upon the water the attendant pulls upon a line attached to the device, which action moves the grapple hook assembly out of the buoyant body.

A further object thereof is to provide a buoyant spherical body with chambered-out portions designed to receive and hold the grapple hook forming the operative part of the device which is provided for trapping the desired object present on the surface of a body of water.

A still further object thereof is to provide, in a device of the kind described, means for latching or locking the grapple hook in the buoyant body designed for encasing it so that it is held against accidental displacement from this body.

Another object thereof is to provide, in a device of the kind described, means for guiding the insertion of the grapple hook into and out of the buoyant body that supports it operatively on the surface of a body of water when it is in extended position.

With the above and further objects in view my invention consists in the combination, arrangement and details of construction disclosed in the drawings and specification, and then more particularly pointed out in the appended claims.

In the drawings, wherein similar reference characters designate similar parts throughout the several views:

Figure 1 is a front end elevation of the invention showing the grapple hook encased, Figure 2 is a cross sectional view therethrough, Figure 3 is a view similar to Figure 2 but showing the grapple hook in extended position, and Figure 4 is a cross sectional view of the invention taken in a plane at right angles to Figure 2.

In the drawings the parts shown are illustrative of the grappling device. I provide a floating element designed to skim along the surface of a body of water upon which it is placed. This floating element can be made out of cork or any other light, buoyant nonabsorbent material. The numeral 10 designates preferably a spherically-shaped buoyant body having the rounded exterior surface 11. This buoyant body 10 is chambered-out in one hemispherical portion thereof so as to provide a circumferentially spaced apart series of radially disposed slots which extend diametrically of the buoyant body 10.

The radially disposed slots have each parallel side walls and are so designed that their back walls form straight surfaces which bisect the axis of the buoyant body as at 15. These slots are designated 12, 13 and 14 respectively, and, as they cross each other's planes centrally of the buoyant body 10, at this point they intercommunicate. This produces a concentric series of sector-shaped segments 17 upon the buoyant body which intervene between the radially disposed slots. Since the several slots 12, 13 and 14 are separated centrally by the central intercommunicating bore 15a, six radially extending slots are, in effect, produced as shown particularly in Figures 1 and 4. They all open out in front of the buoyant body 10, and are closed by their rear walls 15.

The other hemisphere of the spherical body 10, which projects in an opposite direction from the zone of the slots 12, 13, and 14, is formed with a central bore 18 which opens out, at one end, from the rear face of the body 10. At its opposite end this bore intersects the planes of the slots as shown in Figure 3. Here it communicates with the bore 15a formed at the bases of the slots. A ferrule of metal or plastic composition 19 is fitted into the bore 18 and is formed at one end with a flange 20 which abuts the exterior adjacent face of the body 10. The ferrule 19 is formed, at its opposite end, with an annular shoulder 24 formed by drilling a hole into the closed end of the ferrule located. The bore of the ferrule is denoted at 21. The closed end of the ferrule is denoted at 22.

The ferrule 19 has a tubular extension or stem 23 of a lesser diameter than the ferrule proper which has at its outer end a flange 27 of a size larger than the bore 15a of the buoyant body 10 so that this flange may abut the front face of this body. The flanges 20 and 27 of the tubular ferrule thus serve to confine the latter in position rigidly inside of the body diametrically thereof in a plane intersecting the planes of all of the slots.

The ferrule forms a guide member. Slidable in the ferrule is a piston 25 which carries a rod 26 loosely mounted in the reduced stem 23 of the ferrule. The rod 26 is made long enough to project in advance of the front face of the body 10 when it is fully inserted into this body. The rod 26 is formed at its outer free end with an eye or ring 28 having the hole 29. Fixed rigidly upon the rod 26, adjoining this ring 28, is a collar 30.

The grapple hook member associated with the invention consists of a plurality of circumferentially extending radially disposed hook members encircling the length of the rod which extends outside of the body 10. The outermost ends 37 of these hook members are operatively caused to penetrate the collar 30 to be firmly anchored therein. The hook members consist of straight shanks 40, 41 and barbs soon to be described. The straight shanks 40 of the hook members are nested around the rod portion 26a. Between the outer ends 31 and the hooks 41 of the hook members crinkles 38 are formed upon the hook members, preferably at points adjacent to the outwardly converging terminals 37 of the shanks 40 thereof.

The hooks 41 of the hook members are returned over their shanks 40 so that the outer portions of the hooks project in a direction away from the front face of the body 10. These outer portions of the hooks 41 of the hook members terminate in barbs. Each barb is a tapering body 42 coming to a point 47 at the outermost extremity of the hook member.

This tapering body 42 of the barb has a sloping surface 48 disposed diagonally of the shank 40 of the hook member, which is formed in conjunction with the hook 41 into a pointed claw 43 coming to a sharp point at 46. From this construction of the barbs of the grapple hook members it is seen that they have double points, one point extending forwardly and the other rearwardly.

When all the parts are encased in the buoyant body 10, as shown in Figures 1 and 2, the hooks 41 with their sharply-pointed barbs are fully located in the slots 12, 13 and 14 of this body. The hooks 41 of the hook members having been pushed back into the slots as far as they can go, it is seen that they abut the back walls 15 of the slots. This movement of the grapple hook members is brought about by the attendant taking hold of the eye 28 of the rod 26 and pushing it backwardly into the body 10, which carries along the hook members attached by collar 30 to this rod. When the hooks 41 abut the back walls 15 of the buoyant body 10 the piston 25 on the rod 26 is fully retracted as far back as it will go and is located at the extreme rear end of the sperical body 10. When this is done, the crinkles 38 of the shanks 40 of the grapple hook members lie within the outer planes of the slots. The eye ring 28 of rod 26 projects forwardly of the front face of the body 10.

It is understood that a rope or line will be attached at one end to the ring 28 of the rod 26. In moving the rod 26 inside of the cork body 10 as far back as it will extend, the crinkles 38 on the resilient straight shanks 40 of the grapple hook members ride retractingly over the flange 27 of the stem 23 of ferrule 19, and snap thereupon. This snapping of the crinkles upon the flange 27 latches the crinkles 38 upon this flange and locks the grapple hook member securely inside of the body 10. As thus encased no sharp points are presented by the device that might cause injury to the hands of the attendant, as would be the case if any part of the hook members projected outside of the body, or were not encased at all.

When it is desired to use the device the attendant pulls out the rod 26 from the body 10 which houses the grapple hook members, so that the crinkles yield and extricate themselves from the flange 27 of the stem 23 of ferrule 19. He pulls the grapple hooks completely out of the buoyant body 10. He then tosses the device out upon the body of the water so as to locate same as close as is possible to the objective which he wishes to grapple and pull in by means of the line attached to the ring or eye 28 of the rod 26. It will be seen that the buoyant spherical body 10 floats upon the surface of the body of water upon which it is thrown or placed by the attendant. Upon the grapple hook barbs may be placed, if desired suitable bait. Inasmuch as the body 10 is a true sphere it will freely, under influence of the tossing waves or current of the water, rotate upon the ferrule 19 as upon an axis of rotation, or the waves or current may stir the grapple hooks and cause rotation, or the waves or current may stir the grapple hooks and cause rotation thereof with respect to the floating body 10. In either event the grapple hooks will ordinarily be out of registration with the slots of the cork body when the hooks are extended outside of this body. In this manner it is assured that the grapple hooks will not accidentally work their way back into the slots readily and become encased when they should be in working extended position outside of the body 10.

I do not intend to confine myself to the exact details of construction set forth herein save as pointed out in the appended claims.

What I desire to secure by Letters Patent is:

1. A device as described consisting of a spherical buoyant body formed with a circumferentially spaced apart series of radially disposed slots upon a hemisphere thereof, an impaling member consisting of a line securing part and a plurality of grapple hooks slidably mounted in said radially disposed slots, and means located in the other hemisphere of said buoyant body for guiding said impaling member.

2. A device consisting of a buoyant body of spherical shape, formed, upon one hemisphere thereof, with a circumferentially spaced apart series of radially arranged slots, a guide member arranged in the other hemisphere of said buoyant body, an impaling member consisting of an outer line securing part and of a plurality of radially disposed grapple hooks, means movable in said guide member to slide the hooks of said impaling member into the body so that said hooks are lodged in said slots, and means for latching said impaling member in said body to hold it against accidental displacement from the latter.

3. A device as described consisting of a buoyant body formed at one end with a radially disposed series of slits having parallel walls, and having a central bore with which said slits communicate, a guide tube in said bore, a rod slidably mounted and guided in said tube, an impaling member connected at its free end to said rod at the outer end of the latter, and a radially disposed series of grapple hooks carried by said impaling member adapted to be guided by said rod into and out of said body.

4. A device as described consisting of a cork body formed with a plurality of radially disposed slits which intercommunicate, and formed also with a concentric bore the inner end of which communicates with said slits and the outer end of which opens out of said body remote from said slits, a tube in said bore, a piston slidable in said tube, a rod on said piston, and a series of hook members carried by said rod and movable in and out of said slits.

5. A device as described consisting of a cork spherical body formed with a diametric bore therethrough and with a series of radially disposed slits opening out of said body from said bore, a tube arranged in said bore, a piston in said tube, a rod on said piston, and an impaling member having a series of straight shanks arranged around said rod and terminating in returned grapple hooks, said rod adapted to move in and out of said tube carrying the grapple hooks in and out of said body in unison therewith.

6. A device as described consisting of a cork spherical body, a tube arranged centrally therein, a piston in said tube, said tube having a stop at its inner end limiting movement of said piston, a rod on said piston movable into a position to project beyond the body, a line securing eye formed upon said rod, and impaling means mounted upon said rod radially thereof designed to move into and out of said body in unison with said rod.

7. A device as described consisting of a cork spherical body, a guide member extending diametrically in said body and consisting of an inner tubular enlarged-diameter part and an outer reduced extension, a piston sliding in the inner part of said guide member, a rod on said piston slidable in the reduced tubular part of said guide member so as to be extended from said body, said body being formed with a radially separated series of slits concentrically of said reduced part of said guide member, and a series of radially disposed grapple hooks carried by said rod adapted to be disposed in said slits as the rod moves into said body.

8. A device as described consisting of a buoyant spherical body, a tubular guide member arranged diametrically in said body, said guide member being formed at one end with a flange, a rod slidable in said guide member so as to move in and out of said body, a collar secured upon the outer end of said rod, a plurality of circumferentially spaced apart elongated rods having their inner ends secured into said collar and carrying returned grapple hooks upon their other end portions having barbs pointing away from said body, and shanks on said hooks formed with crinkles such that when said rods move into said body said grapple hooks also enter the body and said crinkles resiliently ride over and seat against the flange on said rod to latch the hooks inside of said body.

9. A device as described consisting of a buoyant spherical body, a rod guided therein to move and in and out of the body, an eye formed at the free end of said rod, a collar fixed on said rod adjoining said eye, a plurality of circumferentially arranged straight rods encircling the length of the outer portion of said rod parallel thereto being secured terminally to said collar, said latter rods formed with crinkles between the ends thereof, returned U-shaped shanks formed upon said rods terminating in barbed grapple points projecting away from said body, said body formed with recesses to receive said shanks and grapple points and means carried by said body engageable by said crinkles when the rod moves into said body with said grapple points to lock the latter in said body.

10. A device as described consisting of a cork spherical body formed with a circumferentially spaced apart series of radially disposed slits whose back walls extend diametrically of the body with intervening sector-shaped portions having a concentric bore common to all of said slits, a tubular member consisting of an outer part of enlarged diameter having a flange engaging the outer surface of said body, and having a slender tubular extension also having a flange engaging said body, a piston adapted to move in the enlarged diameter portion of said spherical body having a rod adapted to move in its slender extension so as to project beyond the body, a circumferentially spaced apart series of U-shaped grapple hooks having shanks disposed parallel to said rod and secured to the latter at its outer end, and having pointed barbs projecting in a direction away from said body, whereby when said rod moves inwardly of said tubular member said grapple hooks are encased in said body, and means for latching said shanks in said body.

BERNARD H. HOOK.

REFERENCES CITED

The following references are of record in the file of this patent:

UNITED STATES PATENTS

| Number | Name | Date |
|---|---|---|
| 184,792 | Mihan | Nov. 28, 1876 |
| 454,581 | Mack | June 23, 1891 |
| 913,102 | Burke | Feb. 23, 1909 |
| 961,259 | Reither | June 14, 1910 |
| 1,486,028 | Meighan | Mar. 4, 1924 |
| 2,372,743 | Schofield | Apr. 3, 1945 |